Sept. 7, 1965  I. F. SNYDER  3,204,818
STICK DISPENSER
Filed Feb. 28, 1964
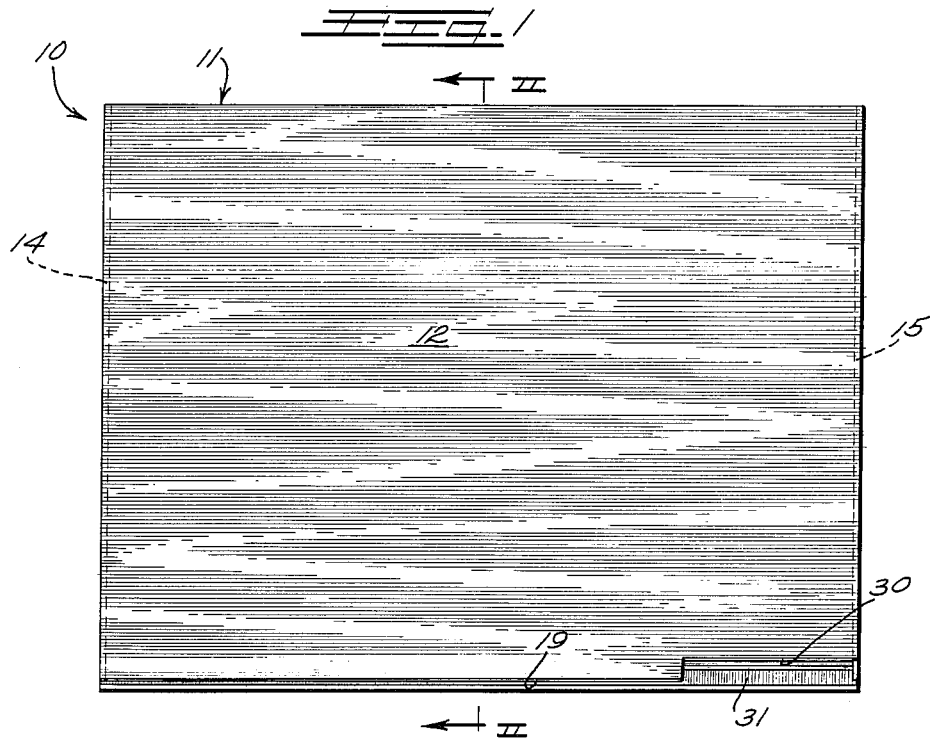
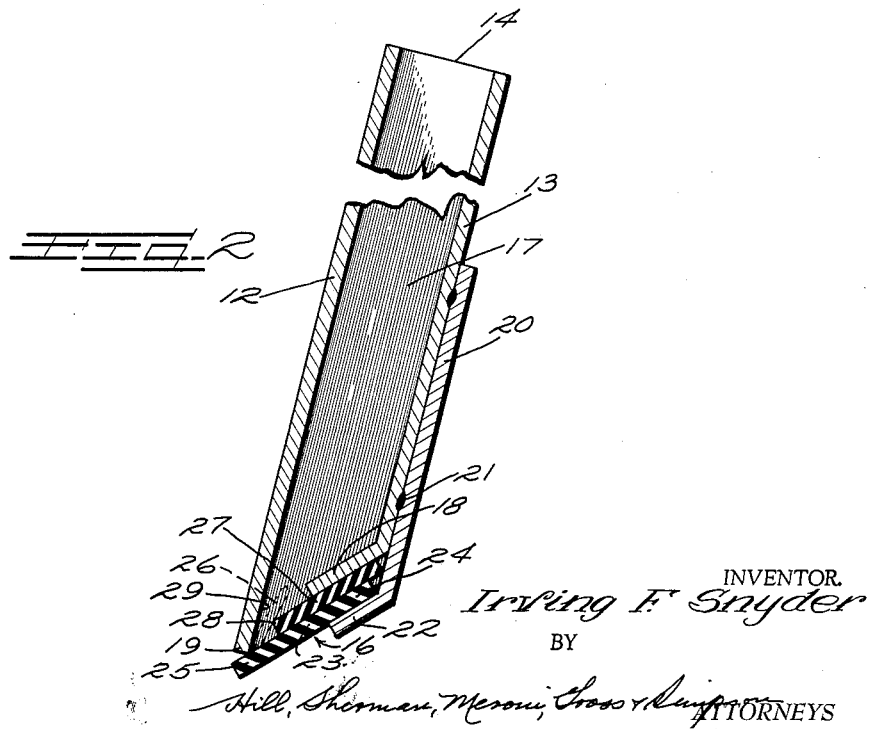
INVENTOR.
Irving F. Snyder
BY
Hill, Sherman, Meroni, Gross & Simpson
ATTORNEYS

United States Patent Office 3,204,818
Patented Sept. 7, 1965

3,204,818
STICK DISPENSER
Irving F. Snyder, Anoka, Minn., assignor to The Cornelius Company, Anoka, Minn., a corporation of Minnesota
Filed Feb. 28, 1964, Ser. No. 348,006
5 Claims. (Cl. 221—309)

This invention relates generally to dispensers, and more specifically to a dispenser which is so constructed as to enable manual dispensing of stirring sticks or the like therefrom.

Although the principles of the present invention may be utilized in connection with various devices to be dispensed, a particularly useful application is made when the same is so constructed as to be usable with sticks, such as stirring sticks used to stir a coffee beverage in which cream, sugar, or both have been added.

Hot coffee beverage vending machines frequently are provided with means by which coffee or sugar are added to beverage being dispensed from a source of black coffee beverage. The degree of mixing which occurs in the drinking cup is frequently not adequate, and the user has become accustomed therefore to stirring such semi-mixed beverage.

The stirring is usually accomplished by means of a stirring stick or paddle which is inexpensive. In fact, I have recognized that the cost of such sticks is so modest that it is impractical to provide mechanical machinery in the coffee-vending machine for dispensing such a stick automatically under the control of the coin mechanism thereof.

The present invention constitutes a manually operated stick dispenser which is mounted on or near any self-service device for dispensing coffee, so that the user may selectably grasp a stirring stick therefrom. The dispenser of this invention is characterized by an extremely simple and inexpensive structure by which stirring sticks are presented to the prospective user one at a time.

Accordingly, it is an object of the present invention to provide a stick dispensing device.

A further object of the present invention is to provide a stick dispenser which is simple in construction.

A further object of the present invention is to provide a manually operated stick dispenser in which the sticks are presented to the prospective user one at a time.

Other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIG. 1 is an elevational view of a stick dispenser provided in accordance with the principles of the present invention; and FIG. 2 is an enlarged cross-sectional view taken along line II–II of FIG. 1.

As shown on the drawings:

The principles of this invention are particularly useful when embodied in a stick dispenser such as illustrated in FIG. 1, generally indicated by the numeral 10. The stick dispenser 10 includes a cabinet 11 which has a front wall 12, a rear wall 13, a pair of side walls 14, 15 joining the front and rear walls 12 and 13 together at their marginal edges, and closing means generally indicated at 16. The walls 12–15 jointly define a generally vertically extending chamber 17 of rectangular cross-section which is closed at its lower end by the closing means 16. The horizontal dimension of the front and rear walls 12 and 13 is selected to accommodate the length of stick to be dispensed. The width of the side walls 14 and 15 and the vertical extent of the walls 12–15 determine the stick-storing capacity of the cabinet 11.

The closing means 16 includes several elements which are best shown in FIG. 2. The rear wall 13 has a lower marginal portion 18 which extends into the chamber 17, sloping downwardly, generally toward the lower edge 19 of the front wall 12, and thus partially closing the lower end of the chamber 17. A clamping member 20 is secured to the outside of the rear wall 13 as by a number of spotwelds 21, and has a lower marginal portion 22 which is disposed in parallel spaced relation to the lower marginal portion 18 of the rear wall 13. A resilient flap 23 completes the closing of the lower end of the chamber 17, and to this end, the flap 23 is an elongated flat strip which has a first or rear marginal portion 24 which is fixedly supported, it being clamped to the rear marginal portion 18 by being received between and held by the lower marginal portions 18 and 22. The flap 23 extends in a downwardly sloping direction from the marginal portions 18–22 to the lower edge 19 of the front wall 12. The non-clamped portion of the flap 23 comprises an opposite or front marginal portion 25 which is yieldable from the chamber-closing position illustrated, by deflection away from the lower edge 19 to release a stick 26 supported on such front marginal portion 25. The flap 23 comprises an elastomer, namely a resilient or rubbery material which is returnable of itself to the illustrated position to reclose the lower end of the chamber 17 which thus is normally closed.

Also supported by the lower marginal portions 18, 22 is a guide or directing means 27, a marginal portion of which is received between the lower marginal portions 18, 22, and a further projecting portion of which is indicated at 28 which coacts with the adjacent surface 29 of the front wall 12 to define a metering or guiding slot through which sticks 26 may pass one at a time from the chamber 17 and onto the upper surface of the front marginal portion 25 of the flap 23.

The clamping member 20 is preferably disposed outside of the chamber 17 so as to provide no obstruction to the free downward movement under the influence of gravity of sticks contained therein. The guide or directing means 27 may be made integral with the flap 23 if desired, and preferably also comprises resilient material to minimize the likelihood of any stick becoming jammed, and to facilitate the clamping of the rear marginal portion 24 of the flap 23.

The elements 18, 27, 23, and 22 preferably extend along the entire lower end of the chamber 17 so as to keep the same substantially closed. Thus, each stick 26 resting on the marginal portion 25 of the flap 23 is disposed horizontally and is supported along its entire length.

To facilitate removal of the stick 26 therefrom, as best seen in FIG. 1, the lower edge 19 of the front wall 12 is cut away as shown at 30 for a portion of its length to provide means which defines a finger-slot 31 which exposes an end portion of the stick 26 for manual grasping thereof. As the right end of the stick is pulled down, the resilient flap 23 yields progressively along its length to the left to release such stick, and recloses of itself from the right. In that the walls 12–15 are generally vertical, the next stick 26 moves under the influence of gravity through the slot defined at the forward edge 28 of the guiding or directing means 27, and such stick is thereafter engaged by the now-reclosed front marginal portion 25 of the flap 23 for support thereby preparatory to being dispensed.

As best seen in FIG. 2, downward deflection of the front marginal portion 25 of the flap 23 does not deflect the guide or directing means 27 so that the metering or guiding slot remains stationary and of constant size. However, the projecting portion 28 of the guide or directing means 27 readily yields in response to tugging on a jammed stick to free the same. Such independent movability of the marginal portion 25 and the projecting portion 28 is preferred.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A stick dispenser comprising:
   (a) a cabinet having generally vertical walls defining a storage chamber of rectangular cross-section;
   (b) means disposed at the lower edges of said walls and normally closing the lower end of said chamber, said means sloping downwardly toward one of said walls; and
   (c) an elongated flat separate strip of elastomer comprising part of said closing means, said strip having a fixedly supported marginal portion extending along the length of said strip and a yieldable marginal portion opposite to said supported marginal portion, said yieldable marginal portion being adjacent to said one of said walls and being yieldable away from the lower edge thereof to release a stick from said chamber.

2. A stick dispenser comprising:
   (a) a cabinet having generally vertical walls defining a storage chamber of rectangular cross-section;
   (b) means disposed at the lower edges of said walls and normally closing the lower end of said chamber, said means sloping downwardly toward one of said walls;
   (c) an elongated flat separate strip of elastomer comprising part of said closing means, said strip having an upper marginal portion and a lower yieldable marginal portion, said yieldable marginal portion being adjacent to said one of said walls and being yieldable away from the lower edge thereof to release a stick from said chamber;
   (d) a second of said walls, opposite to said one wall, having a rigid lower marginal portion comprising a part of said closing means and overlying said upper marginal portion of said strip; and
   (e) a clamping member rigidly secured to the outside of said second of said walls and having a rigid lower marginal portion underlying said upper marginal portion of said strip, said rigid marginal portions jointly compressing and fixedly supporting said upper marginal portion of said strip of elastomer.

3. A stick dispenser comprising:
   (a) a cabinet having four generally vertical walls defining a storage chamber of rectangular cross-section, two of said walls comprising oppositely disposed front and rear walls;
   (b) said rear wall having a rigid lower marginal portion extending into said chamber and sloping downwardly generally toward the lower edge of said front wall, said portion partially closing the lower edge of said chamber;
   (c) a clamping member rigidly secured to said rear wall and having a rigid lower marginal portion extending in substantially parallel spaced relation to said lower marginal portion of said rear wall; and
   (d) an elongated separate flat strip of elastomer having a rear marginal portion compressed between and supported securely by said lower marginal portions, and having a front marginal portion sloping downwardly therefrom to the lower edge of said front wall, and yieldably closing the lower end of said chamber.

4. A stick dispenser comprising:
   (a) a cabinet having four generally vertical walls defining a storage chamber of rectangular cross-section, two of said walls comprising oppositely disposed front and rear walls;
   (d) said rear wall having a lower marginal portion extending into said chamber and sloping downwardly generally toward the lower edge of said front wall, said portion partially closing the lower edge of said chamber;
   (c) a clamping member secured to said rear wall and having a lower marginal portion extending in substantially parallel spaced relation to said lower marginal portion of said rear wall;
   (d) a resilient flap having a rear marginal portion received between and supported securely by said lower marginal portions, and having a front marginal portion sloping downwardly therefrom to the lower edge of said front wall, and yieldably closing the lower end of said chamber; and
   (e) guide means supported with said flap by said lower marginal portions, and operative to direct sticks one at a time onto said front marginal portion.

5. A stick dispenser comprising:
   (a) a cabinet having four generally vertical walls defining a storage chamber of rectangular cross-section, two of said walls comprising oppositely disposed front and rear walls;
   (b) said rear wall having a lower marginal portion extending into said chamber and sloping downwardly generally toward the lower edge of said front wall, said portion partially closing the lower edge of said chamber;
   (c) a clamping member secured to said rear wall and having a lower marginal portion extending in substantially parallel spaced relation to said lower marginal portion of said rear wall;
   (d) a resilient flap having a rear marginal portion received between and supported securely by said lower marginal portions, and having a front marginal portion sloping downwardly therefrom to the lower edge of said front wall, and yieldably closing the lower end of said chamber;
   (e) guide means supported with said flap by said lower marginal portions, and operative to direct sticks one at a time onto said front marginal portion; and
   (f) means in said front wall defining a finger-slot opening into the lower edge thereof for exposing a portion of a stick disposed on said front marginal portion.

References Cited by the Examiner

UNITED STATES PATENTS

| 381,677 | 4/88 | Culver et al. | 221—309 |
| 932,623 | 8/09 | Martter | 221—307 |
| 1,007,546 | 10/11 | Durrum | 221—305 |
| 1,656,615 | 1/28 | Williams | 221—267 |
| 3,018,921 | 1/62 | Hermanson | 221—267 |

RAPHAEL M. LUPO, *Primary Examiner.*

LOUIS J. DEMBO, *Examiner.*